Sept. 6, 1927.　　　　　B. G. WOOD　　　　　1,641,563
PROCESS FOR MANUFACTURE OF PRECIPITATED CALCIUM CARBONATE
Filed Sept. 8, 1925
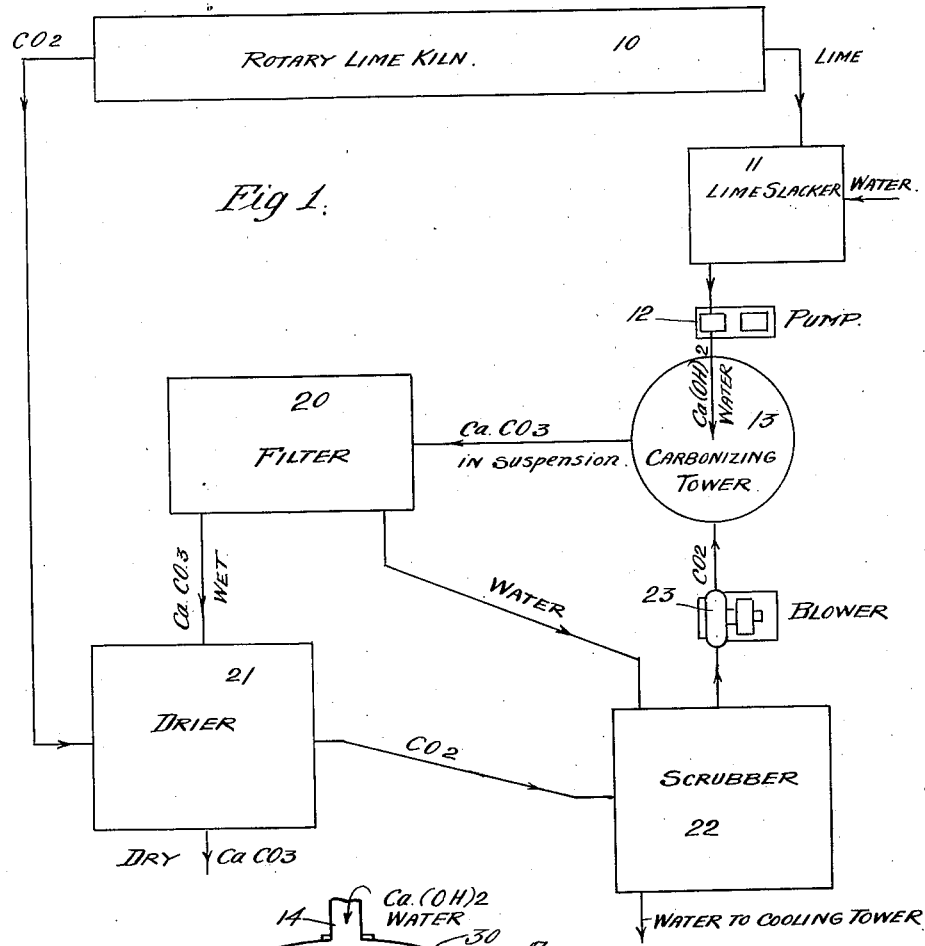
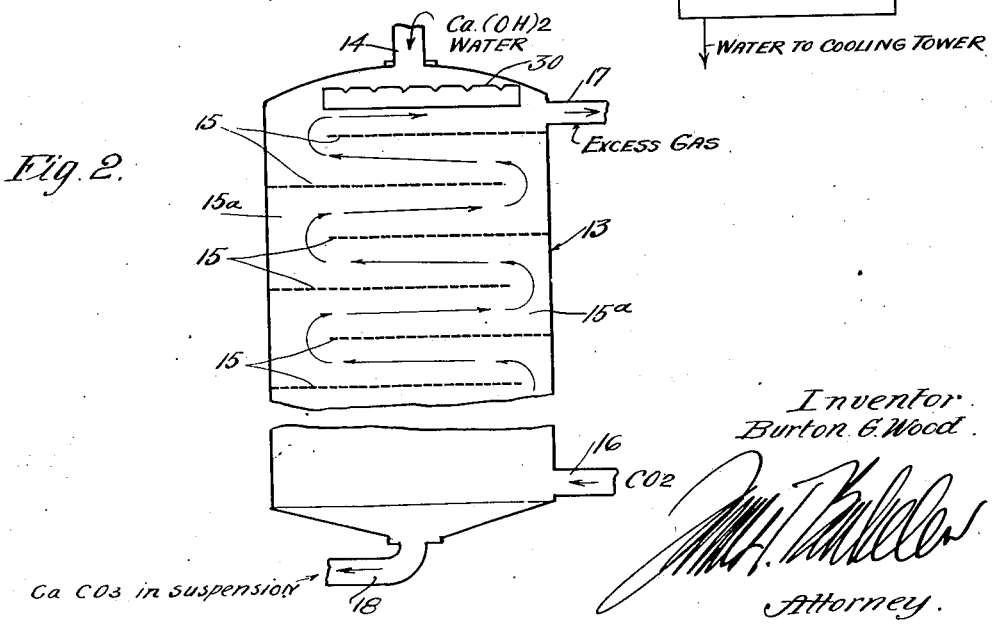
Inventor.
Burton G. Wood.
Attorney.

Patented Sept. 6, 1927.

1,641,563

UNITED STATES PATENT OFFICE.

BURTON G. WOOD, OF LOS ANGELES, CALIFORNIA, ASSIGNOR TO IVANPAH LIME AND CHEMICAL COMPANY, OF LOS ANGELES, CALIFORNIA, A CORPORATION OF CALIFORNIA.

PROCESS FOR MANUFACTURE OF PRECIPITATED CALCIUM CARBONATE.

Application filed September 8, 1925. Serial No. 54,932.

This invention has to do with the manufacture of what is commonly known as amorphous calcium carbonate; that is calcium carbonate in a light flocculent form. Although there may be some difference of opinion as to any form of calcium carbonate being truly amorphous, rather than crystalline, the term amorphous has been commonly applied to calcium carbonate that is finely divided, is light in weight and has a physical characteristic of softness rather than the characteristic hardness usually associated with crystalline substances. Finely divided amorphous carbonate has many valuable uses well known in the art and unnecessary here to detail; in fact the commercial value of a carbonate is measured very largely by its qualities of lightness and softness and fine divisibility.

It is a general object of this invention to provide apparatus and process for the continuous economical manufacture of this desirable form of calcium carbonate.

Processes have heretofore been used and have produced a carbonate of high quality; but so far as I am aware no continuous process has heretofore been used capable of producing a uniform product of high quality. Such being the general object of my invention, there are various other and more specific objects, all of which will become more clearly apparent from the following detailed specification, wherein I describe preferred and illustrative forms of apparatus and process that are typical embodiments of my invention; and for that purpose I refer to the accompanying drawings, in which:

Fig. 1 is a diagram in the nature of a flow sheet illustrative of the apparatus and process; and Fig. 2 is a diagrammatic vertical section of the carbonizing tower of the apparatus.

In practicing my process I start with natural calcium carbonate, which may be more or less pure, depending upon the character of deposit available. Although some calcium carbonate deposits are of high purity, it is not necessary in my process that the original substances be free from impurities, as the process itself tends to eliminate a larger variety of impurities that may occur in nature. The quarried or mined carbonate is first introduced to a continuous lime kiln 10, which may conveniently be a kiln of the rotary type heated by some suitable furnace, all in manners well known to the art. By operating at suitable temperature, the calcium carbonate is within this kiln decomposed to lime (calcium oxide) and carbon dioxide gas. The calcium oxide continuously discharged from the rotary lime kiln is taken to a continuous lime slacker 11 wherein it is continuously mixed with a suitable proportion of water to hydrate the oxide to form calcium hydroxide, with sufficient water excess that the calcium hydroxide insoluble in the water will be carried in suspension therein. Any type of lime slacker may be used that simply performs the function of mixing the lime and water and keeping them agitated so as to keep the hydroxide in suspension. The liquid thus formed is commonly known as milk of lime. It is desirable not to use any more water for this suspension than is necessary, as the water must subsequently be gotten rid of.

This suspension is next taken directly by pump 12 and pumped to the top of carbonizing tower 13. In this carbonizing tower the hydroxide suspension, introduced to the top of the tower through pipe 14 (see Fig. 2)—drops down into a notched edged trough 30 that, by overflow at the edges, distributes the liquid evenly over the uppermost one of a plurality of staggered perforated shelves 15. The liquid passes through the perforations and is showered down onto the next shelf, to be thereupon showered onto the next, and so on to the bottom of the tower. At the same time that the liquid is being showered down through the tower from shelf to shelf, the carbon-dioxide gas is being passed upwardly through pipe 16. The gas necessarily follows a sinuous course around the shelves from the bottom to the top of the tower; the shelves being placed in staggered relation and a space $15^a$ being left at the end of each shelf large enough to pass the flow of carbon dioxide gas. Thus in the space between any two shelves, the gas is flowing more or less horizontally and the liquid is being showered down vertically through that horizontal flow of gas. Any excess gas (any excess carbon dioxide and all other gases, such as nitrogen) may pass off through pipe 17 at the top of the tower either to storage or to atmosphere. The liquid accumulating in the bottom of the tower, being water carrying the now formed calcium carbonate in suspension, passes off through pipe 18 and goes directly to a continuous filter 20 which may be of any suitable type,—for instance a rotary vacuum filter of known type may be used. From this filter the separated calcium carbonate, still wet but freed of all excess water, goes directly to drier 21 from which the dry finely divided calcium carbonate in the amorphous form is delivered for packing.

Drier 21 may be of any suitable form; there are several known driers which operate continuously to dry finely divided substances either in direct contact with a heated gas or by passing over plates heated by such gas. Whatever the specific form of the drier may be, the drier obtains its heat from the carbon dioxide gas coming directly from lime kiln 10. This carbon dioxide gas leaves the lime kiln at a temperature of 1000° F. to 1300° F., and in normal operating conditions it may leave the drier at a substantially lower temperature; the lowering of temperature depending, of course, upon the amount of carbonate being dried, the amount of water being driven off (which in turn depends upon the efficiency of filter 20) and also upon the heat transfer efficiency of the drier itself. It is always the case, however, that calcium carbonate passing through the drier is freed of all moisture so that it is delivered entirely dry; and the temperature to which the carbon dioxide gas has fallen in the drier is of no particular consequence as it is necessary, as I now point out, that the carbon dioxide gas be relatively cool when it is introduced to the carbonizing tower.

Ordinarily the heat transfer in drier 21 is not sufficient to cool the carbon dioxide to the temperature desired, and accordingly the carbon dioxide is led from the drier to a scrubber 22 through which water is sprayed not only to clean the gas, but also to cool it to the proper working temperature, which I find to be about 95° F. The water from the scrubber may be taken to a cooling tower so that it may be reused in the process, it being desirable to introduce cold or cool water to the lime slacker in order to prevent generation of too high temperatures there. The water for the scrubber goes directly from filter 20; and the temperature of the gas as it is taken from the scrubber may be regulated by regulating the amount of water sprayed through the scrubber.

From the scrubber the cooled carbon dioxide gas is taken by a blower 23 and blown into the bottom of carbonizing tower 13, where it passes up through the down showering hydroxide as before described. As the gas passes upwardly through the tower and the hydroxide showers down through it, the hydroxide comes into very intimate contact with the carbon dioxide, it being constantly in an atmosphere of that gas, and being by reason of its suspension in water, in very finely divided form. Each minute particle of hydroxide is by reaction with the gas converted to a minute particle of carbonate; and due to the comparatively low temperature kept in the tower by reason of low temperature of gas, all these minute particles are prevented from coalescing to form large and hard crystalline masses. I have found that if the operations in the tower are carried on at a temperature much higher than approximately 95° F., there is a marked tendency for the carbonate to gather in large hard aggregate masses, thus preventing the attainment of that amorphous quality which it is the object of this process to produce. By thus keeping the temperature comparatively low, the formed carbonate is carried down in the showering water in finely divided form and in suspension, and goes to the filter in fine suspension. Neither in the filter nor in the drier is there any tendency for the carbonate, formed in the manner described, to cake or form aggregate masses, so that the final product delivered from the drier is very finely divided, and is what is known as soft amorphous quality.

By introducing the carbon dioxide gas to the tower at about 95° F., I find that I maintain the operating temperature in the tower at about the same point or at about 95 to 100° F. This operating temperature in the tower I find to be most beneficial, although I wish it to be understood that my process is not necessarily limited to these exact temperatures. Variations in atmospheric temperature may make it necessary to vary the temperature at which the gas is delivered to the tower from time to time in order to maintain the proper reaction temperature. However, under average atmospheric conditions, and where the water that goes into the lime slacker is cooled to substantially atmospheric temperature, the temperature of the water hydroxide suspension going to the tower will not ordinarily be much, if any, above 95° F. Should conditions be such that the temperature of the suspension coming to the tower should be materially higher, then it may become desirable to cool the carbon dioxide gas to a lower temperature so as to maintain the correct reaction temperatures in the tower.

I claim:

1. The herein described process for making amorphous calcium carbonate, that includes decomposing calcium carbonate to form lime and carbon dioxide, slacking the formed lime, passing the resultant calcium hydroxide into intimate contact with the carbon dioxide gas cooled to approximately 95° F., to form calcium carbonate, freeing the formed calcium carbonate of water, and drying the carbonate and reducing the temperature of the carbon dioxide gas before bringing it into contact with the hydroxide by drying the formed calcium carbonate by direct contact with the heated carbon dioxide gas resulting from the decomposition.

2. The herein described process of producing amorphous calcium carbonate, that includes decomposing calcium carbonate to form lime and carbon dioxide gas, slacking the lime with an excess of cool water to form a suspension of calcium hydroxide in water at a temperature of about 95° F., showering said hydroxide suspension down through a suitable tower upwardly through which the carbon dioxide gas is passed to come into intimate contact with the calcium hydroxide to form calcium carbonate in suspension in the water, separating the suspended calcium carbonate from the accompanying water by filtering, and then drying the calcium carbonate by direct contact with the carbon dioxide produced by the original decomposition, and thereby partially cooling the carbon dioxide; further cooling the carbon dioxide to approximately 95° F., by interchange of heat between it and water from the filtering operation, and then passing the cooled carbon dioxide gas upwardly through the tower as aforesaid.

3. The process of making amorphous calcium carbonate, that includes passing a water suspension of calcium hydroxide into intimate and finely divided contact with carbon dioxide gas at a temperature of about 95° F., with the resulting formation of finely divided calcium carbonate, and then freeing the calcium carbonate from the accompanying water.

In witness that I claim the foregoing I have hereunto subscribed my name this 9th day of July, 1925.

BURTON G. WOOD.